(12) United States Patent
Carlsson

(10) Patent No.: US 6,466,788 B1
(45) Date of Patent: Oct. 15, 2002

(54) METHODS AND APPARATUS FOR TRANSFERRING POSITION DATA BETWEEN TERMINALS IN WIRELESS COMMUNICATIONS SYSTEMS

(75) Inventor: Ove Carlsson, Linköping (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 0 days.

(21) Appl. No.: 09/216,830

(22) Filed: Dec. 21, 1998

(51) Int. Cl.⁷ .................................. H04Q 7/20
(52) U.S. Cl. ................. 455/435; 455/461; 701/213
(58) Field of Search .................. 455/435, 436, 455/404, 414, 433, 456, 458, 461; 701/213

(56) References Cited

U.S. PATENT DOCUMENTS

| | | | |
|---|---|---|---|
| 4,980,907 A | * 12/1990 | Raith et al. ................. | 455/432 |
| 5,153,902 A | * 10/1992 | Buhl et al. .................. | 455/458 |
| 5,235,633 A | * 8/1993 | Dennison et al. ........ | 342/357.1 |
| 5,251,248 A | * 10/1993 | Tokunaga et al. ...... | 379/114.27 |
| 5,315,636 A | * 5/1994 | Patel ...................... | 379/201.07 |
| 5,369,684 A | * 11/1994 | Buhl et al. .................. | 455/432 |
| 5,485,163 A | * 1/1996 | Singer et al. ............... | 455/435 |
| 5,502,758 A | 3/1996 | Tsuzuki et al. | |
| 5,513,242 A | * 4/1996 | Mukerjee et al. ........... | 455/403 |
| 5,515,419 A | 5/1996 | Sheffer | |
| 5,515,426 A | 5/1996 | Yacenda et al. | |
| 5,519,760 A | * 5/1996 | Borkowski .................. | 455/456 |
| 5,548,822 A | 8/1996 | Yogo | |
| 5,577,264 A | * 11/1996 | Tuohino ...................... | 455/432 |
| 5,621,783 A | * 4/1997 | Lantto et al. ............... | 455/433 |
| 5,625,668 A | 4/1997 | Loomis et al. | |
| 5,727,057 A | * 3/1998 | Emery et al. ............... | 455/456 |
| 5,815,808 A | * 9/1998 | Valentine .................... | 455/435 |
| 5,822,418 A | * 10/1998 | Yacenda et al. ............ | 379/198 |
| 6,002,932 A | * 12/1999 | Kingdon et al. ............ | 455/432 |
| 6,014,102 A | * 1/2000 | Mitzlaff et al. ............. | 342/457 |
| 6,374,098 B1 | * 4/2002 | Raith et al. ................. | 342/457 |

FOREIGN PATENT DOCUMENTS

| | | |
|---|---|---|
| WO | WO9725828 | 11/1997 |
| WO | WO9852379 | 11/1998 |

\* cited by examiner

*Primary Examiner*—Dwayne Bost
*Assistant Examiner*—L West
(74) *Attorney, Agent, or Firm*—Burns, Doane, Swecker & Mathis, L.L.P.

(57) ABSTRACT

Techniques for ascertaining the geographic position of users and terminals in a wireless communications system are used, for example, by operations personnel in performing system maintenance and by emergency personnel in locating lost or injured individuals. According to an exemplary method of requesting and obtaining user position information, user terminals in a wireless communications system routinely transmit position information to mobile switching centers in the system, and the mobile switching centers maintain up-to-date terminal position information in visiting location registers. Requests for user position information are routed to a home location register which in turn routes terminal position requests to mobile switching centers with which the target users are registered. Terminal position information is retrieved from the appropriate visiting location registers and sent back to the requesting parties with a minimum of system traffic.

20 Claims, 3 Drawing Sheets

| Message | Param 1 | Param 2 | Param 3 | Param 4 | Param 5 |
|---|---|---|---|---|---|
| Position Information | TermId | X coordinate | Y coordinate | Z coordinate | |
| UserPosition Request | Feature Code | UserId | | | |
| UserPosition RequestAck | TermId | X coordinate | Y coordinate | Z coordinate | Originating/ Terminating |
| UserPosition RequestNack | | | | | |
| TerminalPosition Request | Feature Code | UserId | | | |
| TerminalPosition RequestAck | TermId | X coordinate | Y coordinate | Z coordinate | |
| BarringRequest | Feature Code | | | | |
| UnBarringRequest | Feature Code | | | | |
| BarringRequest Ack | | | | | |
| UnBarringRequest Ack | | | | | |
| OSSBarring Request | Feature Code | UserId | | | |
| OSSUnBarring Request | Feature Code | UserId | | | |
| OSSBarring RequestAck | | | | | |
| OSSUnBarring RequestAck | | | | | |

FIG. 4

| Message | Param 1 | Param 2 | Param 3 | Param 4 | Param 5 |
|---|---|---|---|---|---|
| Position Information | TermId | X coordinate | Y coordinate | Z coordinate | |
| UserPosition Request | Feature Code | UserId | | | |
| UserPosition RequestAck | TermId | X coordinate | Y coordinate | Z coordinate | Originating/ Terminating |
| UserPosition RequestNack | | | | | |
| TerminalPosition Request | Feature Code | UserId | | | |
| TerminalPosition RequestAck | TermId | X coordinate | Y coordinate | Z coordinate | |
| BarringRequest | Feature Code | | | | |
| UnBarringRequest | Feature Code | | | | |
| BarringRequest Ack | | | | | |
| UnBarringRequest Ack | | | | | |
| OSSBarring Request | Feature Code | UserId | | | |
| OSSUnBarring Request | Feature Code | UserId | | | |
| OSSBarring RequestAck | | | | | |
| OSSUnBarring RequestAck | | | | | |

METHODS AND APPARATUS FOR TRANSFERRING POSITION DATA BETWEEN TERMINALS IN WIRELESS COMMUNICATIONS SYSTEMS

FIELD OF THE INVENTION

The present invention relates to communications systems, and more particularly, to the transfer of data regarding geographic positions of mobile terminals and mobile terminal users in wireless communications systems.

BACKGROUND OF THE INVENTION

Wireless communications systems are pervasive in the world today. For example, a significant percentage of individuals in developed nations already personally own at least one cellular telephone for use with well established land-based and satellite-based systems. Furthermore, a growing number of developing nations are now bringing wireless systems on line. This insatiable global appetite for wireless technology will only intensify in the foreseeable future.

FIG. 1 depicts an exemplary wireless communications system 100 including ten cells or coverage areas C1–C10, ten base stations B1–B10, a Mobile Switching Center MSC and ten mobile stations M1–M10. Such a wireless system 100 can be constructed, for example, in accordance with any of the well known wireless communications standards, including the European Global System for Mobile (GSM) cellular standard or the United States Digital Cellular (USDC) standard (i.e., the Electronic Industry Association Interim Standard IS-54). While such a system 100 typically includes far more than ten cells, ten base stations and ten mobile stations, ten of each component is sufficient for illustrative purposes.

As shown, one or more base stations can be situated in each of the cells. Although FIG. 1 shows the base stations located toward the cell centers, each base station can instead be located anywhere within a cell. Base stations located toward a cell center typically employ omni-directional antennas, whereas base stations located toward a cell boundary typically employ directional antennas. Those skilled in the art will also appreciate that each individual base station shown in FIG. 1 can, in practice, comprise a base station controller in communication with a number of separate base station units, each unit providing coverage for a cell sector.

Typically, each base station and each mobile station includes a radio transceiver for transmitting and receiving communications signals over the air interface (as defined, for example, by one of the known standards, GSM, IS-54, etc.). More specifically, the base and mobile stations communicate using a form of time, frequency or code division multiple access (i.e., TDMA, FDMA or CDMA) as is known in the art. As the mobile stations move within a cell and from cell to cell, communication with at least one base station is always possible. As a result, mobile station users are able to place, receive and conduct calls from anywhere within the overall system coverage area.

As shown, the base stations are also in communication with the MSC. Though only one MSC is shown in FIG. 1, those of skill in the art will appreciate that an overall system typically includes multiple MSCs, each MSC being coupled (e.g., by radio or hard-wire link) to a unique subset of the base stations in the overall system, and each MSC being capable of communicating with the other MSCs in the system (e.g., via the U.S. Signaling System No. 7, or SS7, protocol). As is known in the art, the MSCs keep track of which cells the mobile stations are registered in and provide a link between the wireless system 100 and the Public Switched Telephone Network (PSTN).

To keep track of which cells the mobile stations are registered in, each MSC typically maintains a Visiting Location Register (VLR) which provides a list of mobile stations presently registered within the coverage area of the MSC (i.e., in the coverage area serviced by all of the base stations which are coupled to the MSC). Furthermore, at least one Home Location Register (HLR) is typically maintained for an overall system, the HLR conventionally providing a list of all local subscribers based within the system coverage area and also providing, for each local subscriber, a description of the various features available to the subscriber. When a mobile station moves into a new coverage area and registers with a new MSC (via a coupled base station), the visited MSC updates its VLR to reflect the presence of the mobile station and also contacts the HLR to obtain subscription information for the mobile station. In this way, mobile stations can seamlessly roam from coverage area to coverage area while maintaining the ability to place and receive calls in accordance with their base subscription.

Conventionally, there has been a strong connection between a wireless subscription and a particular mobile terminal and a particular mobile user. In other words, an individual user conventionally purchases a subscription with which a particular terminal is associated (e.g., by Mobile Identification Number, or MIN), and the individual user is charged for calls placed from the particular terminal. Additionally, calls are conventionally placed by dialing a number associated with a particular terminal, and thus varying numbers are used to reach an individual, depending upon which of many terminals the individual happens to be near.

More recently, however, the growing demand for wireless technology has required a more sophisticated approach to system management. In particular, there has been a recent push toward a global system in which calls are made, not from terminal to terminal, but from user to user. In other words, a system in which each user has a unique identification number by which all calls to that user are placed, irrespective of which terminal the user happens to be using. Toward that end, the concepts of user, terminal and subscription are beginning to diverge. See, for example, co-pending U.S. patent application Ser. No. 08/585,149, filed Jan. 10, 1996 and entitled Cellular Telecommunication Systems having Selectively Associatable Usage Parameters, which is incorporated herein by reference. Consequently, the above described Home and Visiting Location Registers can now include distinct user, terminal and subscription databases.

Recently (e.g., with the advent of the Global Positioning System, or GPS), there has also been a push toward enabling a wireless communications system to provide detailed information regarding the geographic position of users and terminals. However, while the MSCs in a conventional wireless system can determine the cell in which a mobile terminal is located, they typically cannot provide the more precise location information which is often necessary or desirable in practice (e.g., when an individual must be located in an emergency situation or when system operations personnel wish to locate a particular terminal for maintenance or repair). Further, known methods for providing more precise location information (see, e.g., U.S. Pat. No. 5,727,057 to Emery et al.) do not account for the recent divergence of the concepts of user, terminal and subscription.

Consequently, there is a need for improved techniques for ascertaining the geographic location of a mobile terminal in a wireless communications system.

SUMMARY OF THE INVENTION

The present invention fulfills the above-described and other needs by providing methods and apparatus for ascertaining the geographic position of users and terminals in a wireless communications system. Embodiments of the invention enable system users to easily request the position of a terminal (e.g., when operations personnel wish to locate a terminal in order to perform maintenance of traffic system performance or to determine the reasons for lost calls) or the position of a user (e.g., when emergency personnel wish to locate a lost or injured individual). Further, embodiments of the invention permit mobile terminals to be used as navigation instruments and open the door to more sophisticated supervision of taxis, buses and other transport vehicles. Advantageously, aspects of the invention can be readily incorporated within a wireless communications protocol which contemplates the distinct concepts of user, terminal and subscription.

An exemplary method for requesting and obtaining user position information in a wireless communications system includes the steps of: sending terminal position information from user terminals to mobile switching centers with which the user terminals are registered; storing the terminal position information in visiting location registers of the receiving mobile switching centers; entering a feature code and a user identification code at a requesting terminal (the feature code and user identification code indicating a request for position information regarding a remote system user associated with the user identification code); sending a user position request message and the user identification code from the requesting terminal to a mobile switching center with which the requesting terminal is registered; forwarding the user position request message from the mobile switching center to a home location register in the system; determining (at the home location register) which user terminals the remote system user is registered with; sending a terminal position request message and the user identification code to each mobile switching center where the remote user is registered on a terminal; retrieving (for each terminal with which the remote user is registered) terminal position information from a visiting location register; sending (for each terminal with which the remote user is registered) a terminal position request acknowledged message, a terminal identification code and retrieved terminal position information to the home location register; and forwarding at least one of the terminal position request acknowledged messages from the home location register to the requesting terminal.

Prior to determining which user terminals the remote system user is registered with, a determination can be made (e.g., at the home location register) whether position information requests for the remote user are barred. If so, a user position request not acknowledged message can be sent from the home location register to the mobile switching center with which the requesting terminal is registered, and then back to the requesting terminal.

According to exemplary embodiments, a user terminal can include a global positioning system receiver for determining position coordinates. Alternatively, the user terminal can compute position coordinates based on at least one timing advance parameter received from at least one base station in the wireless communications system. In either case, the user terminal can periodically transmit position coordinates to a mobile switching center with which it is registered. Alternatively, the mobile switching center can periodically poll the user terminal for position coordinates, or wait and request the position coordinates when a request for position information regarding the user terminal is made.

An exemplary wireless communications system according to the invention includes a plurality of user terminals, at least one mobile switching center (each mobile switching center including a visiting location register), and at least one home location register. According to exemplary embodiments, each user terminal is configured to transmit terminal position information to a mobile switching center with which the user terminal is registered, and each mobile switching center is configured to store received terminal position information in a corresponding visiting location register. Additionally, the home location register is configured to receive requests for position information relating to target users registered in the system and, for each received request, to send a terminal position request to each mobile switching center where a target user is registered on a terminal. Upon receiving terminal position requests, the mobile switching centers can retrieve terminal position information from their visiting location registers and transmit the retrieved terminal position information to the home location register.

The above-described and other features and advantages of the invention are explained in detail hereinafter with reference to the illustrative examples shown in the accompanying drawings. Those of skill in the art will appreciate that the described embodiments are provided for purposes of illustration and understanding and that numerous equivalent embodiments are contemplated herein.

BRIEF DESCRIPTION OF THE DRAWINGS

FIG. 4 is a table listing exemplary control messages and associated message parameters according to the present invention.

DETAILED DESCRIPTION OF THE INVENTION

Figure 1:
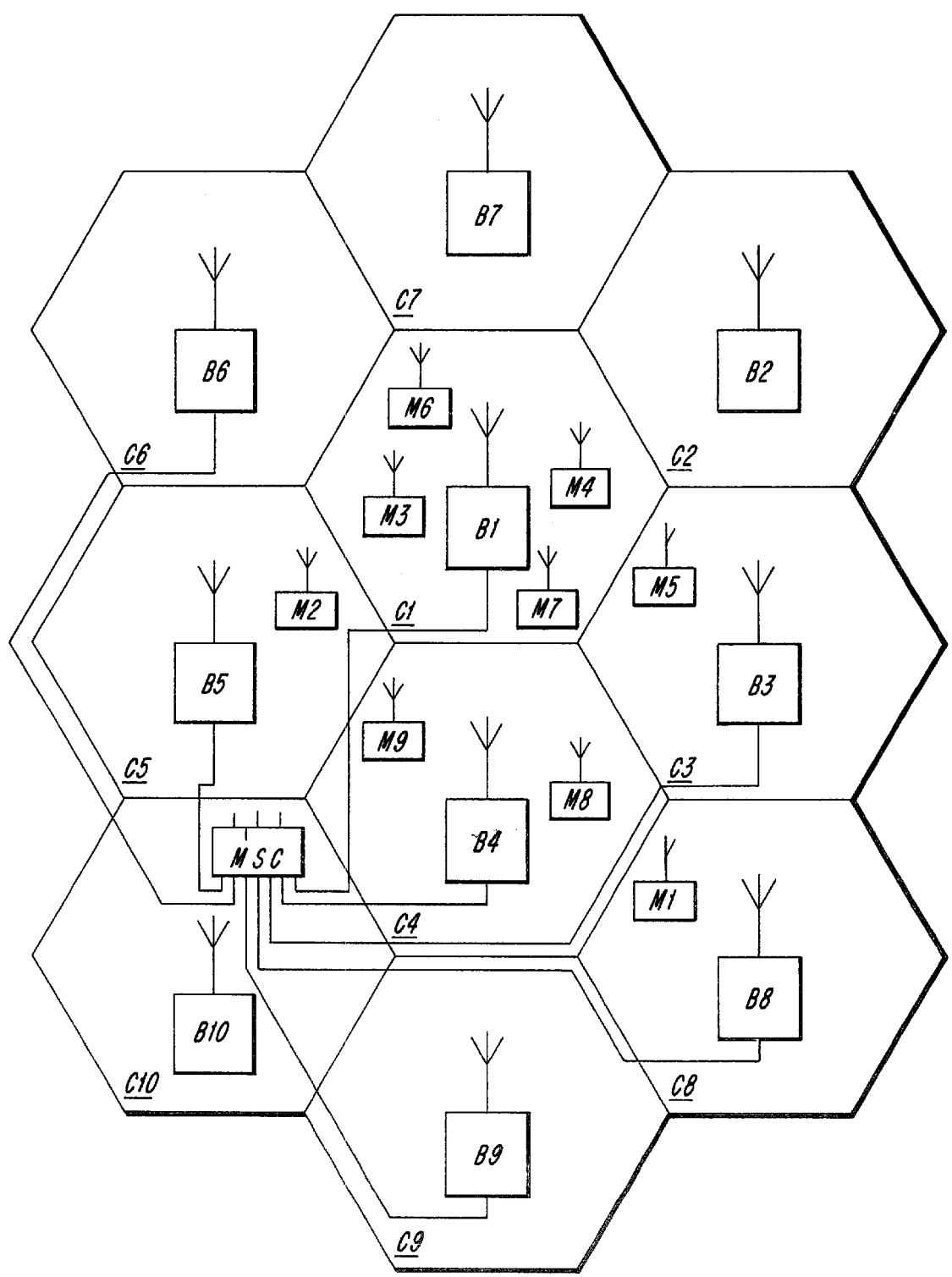
FIG. 1 depicts an exemplary wireless communications system in which the teachings of the present invention can be implemented.
Figure 2:
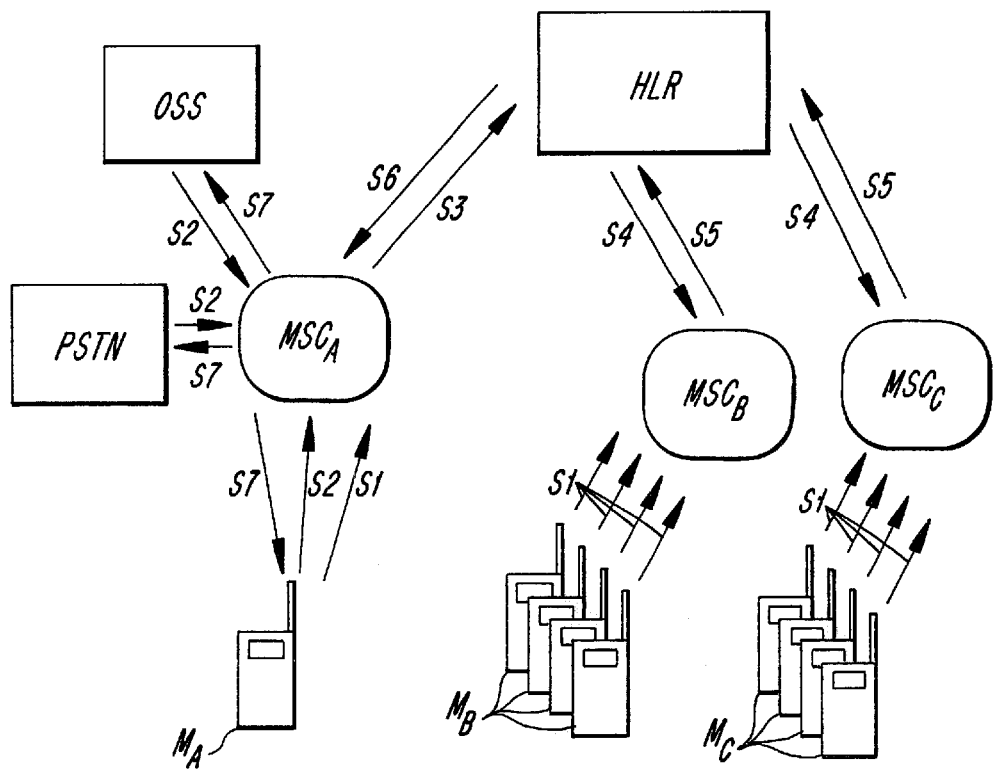
FIG. 2 is a flow diagram depicting steps in an exemplary method of obtaining user and terminal position data according to the invention.

FIG. 2 depicts steps in an exemplary method for requesting and obtaining, from a terminal (e.g., from a telephone or a computer coupled to a Public Land Mobile Network, or PLMN), the geographic position of other terminals with which a particular user has registered. Exemplary methods by which a user can register with (and de-register from) a terminal are described in the above cited U.S. patent application Ser. No. 08/585,149. Those of skill in the art will appreciate that the functionality of the system components described with respect to FIG. 2 can be implemented using, for example, known digital signal processing components or digital computers.

As is indicated by arrows labeled S1 in FIG. 2, all registered mobile terminals $M_A$, $M_B$, $M_C$ can, according to the invention, regularly send position information to their visited switching centers $MSC_A$, $MSC_B$, $MSC_C$.

Alternatively, the switching centers can periodically poll registered terminals for current position information. Further, the switching centers can request current position information from terminals whenever position requests are made. Thus, according to the invention, each MSC can store up-to-date position information for each registered terminal in its respective Visiting Location Register.

Each terminal can, for example, be equipped with a GPS receiver and can therefore provide the position information in the form of X-Y-Z Cartesian coordinates (i.e., longitude-latitude-altitude). Alternatively, each terminal can compute its own position using the timing advance parameter which is typically transmitted from the base stations in a wireless system. The timing advance parameter indicates to a mobile station the appropriate timing to be used in transmitting data in TDMA time slots (i.e., to compensate for delays due to the physical separation between the base station and the mobile terminal) and thus provides the mobile station with an indication of the distance between the mobile station and the base station. The timing advance parameter from one base station can therefore be used to pinpoint the position of the terminal within a fixed radius of the base station, and timing advance parameters from two or more base stations can be used to further narrow the position of the terminal.

To initiate a user location request, a first user registered on a first terminal $M_A$ enters (i.e., by pushing buttons on a telephone keypad or keys on a computer keyboard of terminal $M_A$) an appropriate feature code (e.g., a character sequence indicating that the first user wishes to make a location request) and an identification code, or user ID, corresponding to the remote user the first user wishes to locate. Thereafter, as is indicated by arrows labeled S2 in FIG. 2, a User Position Request code is sent from the terminal $M_A$ to the local switching center $MSC_A$. As is shown by additional arrows labeled S2 in the figure, a similar request can also be made from either a fixed terminal in the PSTN or from a fixed terminal in an Operations Support System OSS (which can, for example, be used to respond to alarms indicating that certain system equipment has failed or to adjust various system parameters, such as base station transmit frequencies).

Upon receiving the User Position Request from the first mobile terminal $M_A$, the local switching center $MSC_A$ forwards the request to the system HLR (as is indicated by an arrow labeled S3 in FIG. 2). Thereafter, the HLR uses information in the user and terminal registers within the HLR (again, see the above cited U.S. patent application Ser. No. 08/585,149) to determine which terminals the user is registered with. Assuming the user has not barred position requests (see the detailed discussion below with respect to barring and unbarring of position requests by a user or by an OSS), the HLR sends a Terminal Position Request to each of the mobile switching centers $MSC_B$, $MSC_C$ where the user is presently registered on a terminal. Transmission of the Terminal Position Requests is indicated by arrows labeled S4 in FIG. 2.

Upon receiving a Terminal Position Request, each queried switching center $MSC_B$, $MSC_C$ answers the HLR with one Terminal Position Request Acknowledgment (including position information data) for each terminal with which the user is actually currently registered. Transmission of the Terminal Position Request Acknowledgments is indicated by arrows labeled S5 in FIG. 2.

Upon receiving each Terminal Position Request Acknowledgment, the HLR transmits a corresponding User Position Request Acknowledgment (including the position information and an indication, as determined by the HLR, of whether the remote user is an originating or terminating user on the corresponding remote terminal) to the originating switching center $MSC_A$. Transmission of the User Position Request Acknowledgements is indicated by an arrow labeled S6 in FIG. 2. However, if the original User Position Request was barred for the remote user, the HLR instead transmits a single User Position Request Not Acknowledged back to the originating switching center $MSC_A$ without sending any Terminal Position Requests to the remote switching centers $MSC_B$, $MSC_C$.

Upon receiving each User Position Request Acknowledgment (i.e., one Acknowledgment for each remote terminal with which the remote user is registered), the originating switching center $MSC_A$ forwards the Acknowledgment on to the originating terminal $M_A$, OSS or PSTN, as appropriate. Forwarding of the Acknowledgements is indicated by arrows labeled S7 in FIG. 2. Alternatively, if the originating switching center $MSC_A$ receives a User Position Request Not Acknowledged message from the HLR (indicating that position requests are barred for the remote user), that message is sent (one time only) back to the originating terminal $M_A$, OSS or PSTN.

By maintaining current position data in the VLRs, and by monitoring registrations and request barring/unbarring at the HLR, the above described technique provides efficient transmission of position data, on a per request basis, with a minimum of system traffic. As noted above, the technique can be used, for example, to quickly locate terminals for purposes of system maintenance or to find lost or injured individuals in emergency situations.

Figure 3:
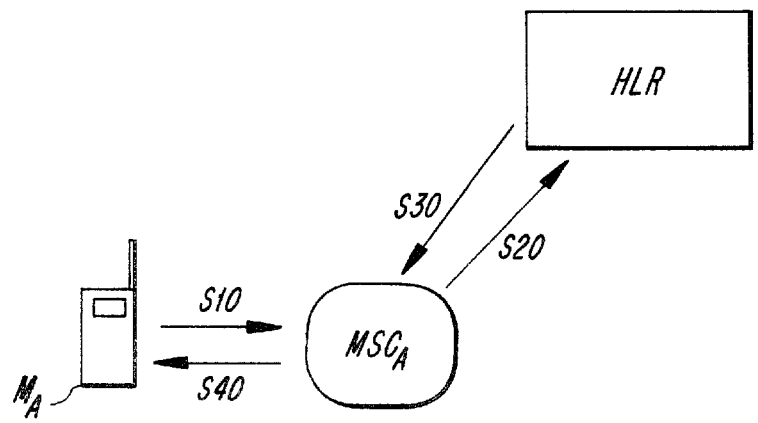
FIG. 3 is a flow diagram depicting steps in an exemplary method of blocking and unblocking user position requests according to the invention.

According to embodiments of the invention, a system user can (e.g., for purposes of security or privacy) bar position requests by others. FIG. 3 depicts steps in an exemplary method by which a system user can do so.

A user registered as an originating user on the mobile terminal $M_A$ inputs an appropriate feature code (e.g., a character sequence) indicating whether User Position Requests shall be barred or unbarred for his own User ID. Thereafter, a Barring Request or an Unbarring Request, as appropriate, is sent to the local switching center $MSC_A$, as is indicated by an arrow labeled S10 in FIG. 3.

Upon receiving the Barring or Unbarring Request from the mobile terminal $M_A$, the switching center $MSC_A$ forwards the Request on to the system HLR. Forwarding of the request to the HLR is indicated by an arrow labeled S20 in FIG. 3. Upon receiving the Request, the HLR updates the User Register within the HLR for the user who is registered as originating user on the terminal (again, see the above cited U.S. patent application Ser. No. 08/585,149) and sends a Barring or Unbarring Request Acknowledgment, as appropriate, back to the originating switching center $MSC_A$ (as is indicated by an arrow labeled S30 in FIG. 3). Thereafter, the switching center $MSC_A$ forwards the Request Acknowledgment to the terminal $M_A$ (as indicated by an arrow labeled S40 in FIG. 3), and the Barring or Unbarring Request process is complete.

In addition to a user being able to Bar and Unbar Position Requests, an OSS system can also be used to Bar and Unbar Position Requests for system users. To do so, an OSS operator can input a command or feature code indicating that position requests for a particular user ID are to be barred or unbarred, as desired. An OSS Barring Request or OSS Unbarring Request, as appropriate, is sent to the switching center to which the OSS is connected, and the switching center forwards the request on to the system HLR. Upon receiving the request, the HLR updates the User Register in the HLR for the user indicated in the request and sends an OSS Barring or Unbarring Request Acknowledgment back to the switching center. Thereafter, the switching center forwards the Request Acknowledgment back to the OSS, and the OSS Barring/Unbarring Request process is complete.

FIG. 4 provides a table listing each of the various messages, and associated parameters, which is described above with respect to the exemplary embodiments. As shown, the Position Information message includes a Terminal ID and a set of X-Y-Z location coordinates. The User Position Request message includes a Feature Code and a User ID, and the User Position Request Acknowledged message includes a Terminal ID, a set of X-Y-Z coordinates and an Originating/Terminating caller indicator or flag. The Terminal Position Request message includes a Feature Code and a User ID, and the Terminal Position Request Acknowledged message includes a Terminal ID and a set of X-Y-Z coordinates. The OSS Barring Request and the OSS Unbarring Request messages include a Feature Code and a User ID, whereas the Barring Request and Unbarring Request messages (from a user) include a Feature Code only (the User ID is presumed to be that of the requester). As shown in FIG. 4, the User Position Request Not Acknowledged, Barring Request Acknowledged, Unbarring Request Acknowledged, OSS Barring Request Acknowledged and OSS Unbarring Request Acknowledged messages do not require parameters.

The above described embodiments of the invention provide efficient transmission of position data, on a per request basis, with a minimum of system traffic. The disclosed techniques can be used, for example, to quickly locate terminals for purposes of system maintenance or to find lost or injured individuals in emergency situations.

Those skilled in the art will appreciate that the present invention is not limited to the specific exemplary embodiments which have been described herein for purposes of illustration and that numerous alternative embodiments are also contemplated. The scope of the invention is therefore defined by the claims appended hereto, rather than the foregoing description, and all equivalents which are consistent with the meaning of the claims are intended to be embraced therein.

What is claimed is:

1. A method of requesting and obtaining user position information in a wireless communications system, the system including a plurality of user terminals, at least one mobile switching center and a home location register, and the method comprising the steps of:

sending terminal position information from the user terminals to mobile switching centers with which the user terminals are registered;

storing the terminal position information in visiting location registers of the receiving mobile switching centers;

entering a feature code and a user identification code at a requesting terminal, the feature code and user identification code indicating a request for position information regarding a remote system user associated with the user identification code;

sending a user position request message and the user identification code from the requesting terminal to a mobile switching center with which the requesting terminal is registered;

forwarding the user position request message from the mobile switching center to the home location register;

determining, at the home location register, which user terminals the remote system user is registered with;

sending a terminal position request message and the user identification code to each mobile switching center where the remote user is registered on a terminal;

retrieving, for each terminal with which the remote user is registered, terminal position information from a visiting location register;

sending, for each terminal with which the remote user is registered, a terminal position request acknowledged message, a terminal identification code and retrieved terminal position information to the home location register; and forwarding at least one of the terminal position request acknowledged messages from the home location register to the requesting terminal.

2. The method of claim 1, wherein, prior to determining which user terminals the remote system user is registered with, a determination is made, at the home location register, whether position information requests for the remote user are barred.

3. The method of claim 2, wherein, for barred position information requests, a user position request not acknowledged message is sent from the home location register to the mobile switching center with which the requesting terminal is registered, and wherein the user position request not acknowledged message is forwarded from the mobile switching center to the requesting terminal.

4. The method of claim 1, wherein said step of sending a terminal position request acknowledged message from the home location register to the requesting terminal includes the steps of:

supplementing the terminal position request acknowledged message by adding, at the home location register, a parameter indicating whether the remote user is registered as an originating or a terminating user on the terminal to which the terminal position request acknowledged message corresponds;

forwarding the supplemented terminal position request acknowledged message from the home location register to the mobile switching center with which the requesting terminal is registered; and forwarding the supplemented terminal position request acknowledged message from the mobile switching center to the requesting terminal.

5. The method of claim 1, wherein a user terminal includes a global positioning system receiver, and wherein said step of sending terminal position information includes the step of periodically transmitting position coordinates from the user terminal to a mobile switching center with which the user terminal is registered.

6. The method of claim 1, wherein a user terminal computes position coordinates based on at least one timing advance parameter received from at least one base station in the wireless communications system, and wherein said step of sending terminal position information includes the step of periodically transmitting position coordinates from the user terminal to a mobile switching center with which the user terminal is registered.

7. The method of claim 1, wherein said step of sending terminal position information includes the step of periodically polling at least one user terminal for current position coordinates.

8. The method of claim 1, wherein the requesting terminal is a mobile terminal in the wireless communications system.

9. The method of claim 1, wherein the requesting terminal is a fixed terminal in an operations support system of the wireless communications system.

10. The method of claim 1, wherein the requesting terminal is a fixed terminal in a public switched telephone network.

11. A wireless communications system, comprising:
a plurality of user terminals;
at least one mobile switching center, each mobile switching center including a visiting location register; and
a home location register,
wherein each user terminal is configured to transmit terminal position information to a mobile switching center with which the user terminal is registered,
wherein each mobile switching center is configured to store received terminal position information in a corresponding visiting location register, and
wherein said home location register is configured to receive requests for position information relating to target users registered in said system and, for each received request, to send a terminal position request to each mobile switching center where a target user is registered on a terminal.

12. The system of claim 11, wherein a mobile switching center, upon receiving a terminal position request, retrieves terminal position information from said corresponding visiting location register and transmits the retrieved terminal position information to said home location register.

13. The system of claim 11, wherein a user terminal includes a global positioning system receiver, and wherein said user terminal periodically transmits position coordinates to a mobile switching center with which said user terminal is registered.

14. The system of claim 11, wherein a user terminal computes position coordinates based on at least one timing advance parameter received from at least one base station in said system, and wherein said user terminal periodically transmits current position coordinates to a mobile switching center with which said user terminal is registered.

15. The system of claim 11, wherein a mobile switching center periodically polls registered user terminals for current position information.

16. A method of requesting and obtaining user position information in a wireless communications system, the system including a plurality of user terminals, at least one mobile switching center and a home location register, and the method comprising the steps of:
entering a feature code and a user identification code at a requesting terminal, the feature code and user identification code indicating a request for position information regarding a remote system user associated with the user identification code;
sending a user position request message and the user identification code from the requesting terminal to a mobile switching center with which the requesting terminal is registered;
forwarding the user position request message from the mobile switching center to the home location register;
determining, at the home location register, which user terminals the remote system user is registered with;
sending a terminal position request message and the user identification code to at least one mobile switching center where the remote user is registered on a terminal;
obtaining, at the at least one mobile switching center, terminal position information for at least one terminal with which the remote user is registered;
sending, for the at least one terminal with which the remote user is registered, a terminal position request acknowledged message, a terminal identification code and obtained terminal position information to the home location register; and
forwarding the terminal position request acknowledged message, the terminal identification code and the obtained terminal position information from the home location register to the requesting terminal.

17. The system of claim 11, wherein the home location register is also configured to determine which user terminals the target users are registered with.

18. A wireless communications system comprising:
a plurality of user terminals;
at least one mobile switching center, each mobile switching center including a visiting location register; and
a home location register,
wherein each user terminal is configured to transmit terminal position information to a mobile switching center with which the user terminal is registered,
wherein each mobile switching center is configured to store received terminal position information in a corresponding visiting location register, and
wherein said home location register is configured to receive a request for position information relating to a target user registered in said system and to determine which user terminals the target user is registered with.

19. The system of claim 18, wherein the terminal position information is more detailed than a particular cell in which the terminal is located.

20. The system of claim 19, wherein the terminal position information is obtained either by using a global positioning system receiver or by using at least one timing advance parameter received from at least one base station in the system.

* * * * *